(12) United States Patent
Seewald

(10) Patent No.: US 7,985,436 B2
(45) Date of Patent: Jul. 26, 2011

(54) METHOD OF PRODUCING RAW SAUSAGE, COMPRISING AN ACCELERATED MATURING PROCESS

(75) Inventor: Marcus J. Seewald, Pfitzdorf (DE)

(73) Assignee: Zylum Beteiligungsgesellschaft mbH & Co. Patente II KG, Schoenefeld/Waltersdorf (DE)

( * ) Notice: Subject to any disclaimer, the term of this patent is extended or adjusted under 35 U.S.C. 154(b) by 706 days.

(21) Appl. No.: 10/542,179

(22) PCT Filed: Dec. 10, 2003

(86) PCT No.: PCT/DE03/04076
§ 371 (c)(1),
(2), (4) Date: Oct. 5, 2005

(87) PCT Pub. No.: WO2004/066755
PCT Pub. Date: Aug. 12, 2004

(65) Prior Publication Data
US 2006/0105079 A1    May 18, 2006

(30) Foreign Application Priority Data
Jan. 16, 2003 (DE) .................. 103 01 354

(51) Int. Cl.
A23L 1/31    (2006.01)
A23G 1/00    (2006.01)
(52) U.S. Cl. ................. 426/56; 426/656; 426/105
(58) Field of Classification Search .......... 426/646, 426/105, 30
See application file for complete search history.

(56) References Cited

U.S. PATENT DOCUMENTS 5,888,563 A    3/1999    Mehansho et al. ............ 426/72

FOREIGN PATENT DOCUMENTS

| | | |
|---|---|---|
| DE | 4230434 C1 | 2/1994 |
| DE | 19641633 C1 | 10/1997 |
| DE | 20112829 U1 | 9/2001 |
| DE | 10047515 A1 | 4/2002 |
| EP | 0130228 | 1/1985 |
| EP | 0572305 A1 | 12/1993 |
| EP | 0641857 A1 | 3/1995 |
| EP | 1048227 B1 | 11/2000 |
| WO | PCT/US90/00569 | 8/1990 |
| WO | PCT/FI00/00899 | 4/2001 |

OTHER PUBLICATIONS

Robinson, R.K., "Fermented Foods" in Encyclopedia of Food Microbiology, Elsevier, 2000, p. 744-752.*
Kerry et al. Meat Processing-Improving Quality, Woodhead Publishing, 2002, p. 382.*
Rader, J.I. "Folic Acid Fortification, Folate Status and Plasma Homocysteine" in The Journal of Nutrition, Supplement 2002, p. 2466S-2470S.*
Aslanova MA; RU 2213493 C2, Derwent Abstract only, Oct. 10, 2003.*
Shankman et al. "Vitamin Requirements of Twenty-Three Lactic Acid Bacteria" J. Biol. Chem. 1947 (168), pp. 23-31.*
Snell, E.E. "The Nutritional Requirements of the Lactic Acid Bacteria and Thier Application to Biochemical Research" J. Bacteriol. Oct. 1945 50(4), pp. 373-382.*
Henry et al., Nutrition Handbook for Food Processors, Chapter 8, Woodhead Publishing, 2002, pp. 202-203.*
Fleischverarbeitung; Aus der Industrie: Schnellreifende Starterkultur (2001); (Meat Processing; From Industry: Quickly Curing Starter Cultures).
Schlegel, Hans G.: Allgemeine Mikrobiologie: Ch. 8.2 Milchsaeuregaerung and Lactobacteriaceae; p. 265; Georg Thiema Verlag, Stuttgart Germany and New York, NY (1981); (General Microbiology; Ch. 8.2; Lactic Acid Fermentation and Lacto bacteriaceae).

* cited by examiner

Primary Examiner — Keith D Hendricks
Assistant Examiner — Elizabeth Gwartney
(74) Attorney, Agent, or Firm — Panitch Schwarze Belisario & Nadel LLP

(57) ABSTRACT

A method of making raw sausage by an accelerated maturing process consisting of modifying conventional recipes and basic principles relating to the making of raw sausage by adding between about 5 mg and about 25 mg, preferably 10 mg, of folic acid or folate or both per kg of sausage meat.

17 Claims, No Drawings

METHOD OF PRODUCING RAW SAUSAGE, COMPRISING AN ACCELERATED MATURING PROCESS

BACKGROUND OF THE INVENTION

1. Field of the Invention

The invention relates to a method of making raw sausage by an accelerated maturing process (also referred to as "ripening").

2. The Prior Art.

The essential trends of our culture of nutrition are settled, and the consumption of sausages several times each week is a basic element thereof. The insufficient consumption of fresh fruit and green vegetables and an increase in eating out with, at the same time, an energetic over-supply characterized the habitual behavior of the final consumers in the selection of food.

This finding has often served as the starting point of looking for realistic ways of solution for accommodating the final consumer in his consumption of sausages.

For instance, German utility model specification DE 201 12 829 U1 discloses ways of providing sausages of reduced levels of cholesterol and purine. The invention discloses preferred reduced-fat kinds of meat for the production of sausages and to substitute vegetable fats therefor. DE 42 30 434 C1 discloses a sausage suitable for long-term storage which by an addition of powdered soft cheese obtains a delicate aroma, good durability and a high optical appearance. DE 196 41 633 C1 discloses a method of producing raw sausages by adding lactic acid yields improved spreadability and color stability.

Overall, these three inventive methods exclusively disclose refinements if the product quality without, or with little, regard, however, to aspects of health.

Inventions also exist which relate to enriching foods produced from meat and fat with vitamins.

For instance, WO 90/09108 refers to minute artificial structures or "porous polymeric beads" incorporated in foods for receiving and thus protecting vitamins. After receiving vitamins, these artificial minute structures are covered by water-soluble coatings which dissolve only in heat.

Furthermore, DE 100 47 515 A1 discloses a vitamin-enriched meat product which obtains its vitamin-enrichment by a tumbling[1] process of meat in a mixture of vitamins dissolved in a fluid.

[1] In the tumbling process brine is injected into the meat, and the meat is also kneaded and massaged (Translator's note).

European patent application EP 1,048,227 discloses meat products with complementing omega-3-fatty acids, vitamins and ballast materials aiming at healthful nutrition with a view to reaching final consumers who do not wish to change their customary nutrition.

These three approaches primarily disclose ideas for vitamin-enriching in accordance with the "shotgun principle" in order thereby to attain health of a higher value. Suggestions of natural biological processes in meat products to be produced are, however, completely lacking.

OBJECT OF THE INVENTION

It is an object of the invention to overcome the disadvantages of these inventive solutions.

SUMMARY OF THE INVENTION

In accordance with the invention, the object is accomplished by a method of producing raw sausage by an accelerated maturing process on the basis of known recipes and basic principles of typical kinds of raw sausage by adding about 5 mg to about 25 mg, preferably 10 mg, of folic acid and/or folate per kilogram of raw sausage meat. The folic acid and/or folate is added to the raw sausage meat in a uniform distribution, preferably during the operating step in which spice is added. During the production of raw sausage there are no production steps based on endothermic heat as is the case, for instance, in connection with sausage to be heated or boiled in water. Heating would lead to the destruction of microorganisms.

For the production of raw sausage in accordance with the invention folic acid and/or folate are added after comminution of lean meat in a cutter, preferably during the spice-adding operational step while ensuring uniform distribution. Nitrite pickling salt is admixed following the subsequent addition and comminution of bacon, so that the raw sausage meat or sausage meat develops the requisite bond within an interval of time of about 20 min. After subsequent stuffing into natural sausage casings the actual biochemical maturing will commence. The stuffed raw sausage is stored at a temperature of about 16° C. and 90% relative humidity, and after about 24 h the temperature is changed to 23° C. at about 73% relative humidity. Maturing takes place during this time window. The microorganisms increase. Microbiological maturing causes activation of lactic acid production. At the same time the raw sausage begins to develop or unfold specific natural aroma substances in consequence of the growth of the microorganisms and the attendant activity of microorganisms. As a result of the enrichment with folic acid, the limitation of the folic acid growth factor which can be found only in very small quantities in the starter materials of the sausage meat is overcome.

Repeated tests resulted in reproducible effects, such as
  a significant improvement in taste and odor;
  accelerated maturing;
  simplification and better standardization of the maturing process;
  extremely good storage characteristics;
  improved product characteristics such as, for example, better firmness for cutting and uniform color development;
  reduced risk of defective production.

These effects resulting from the pure stimulation only of the natural maturing processes by adding folic acid and/or folate may be explained by a rapid increase of the number of microorganisms generated by micro-cocci or lacto-bacteria and the like, which lead to generating lactic acid and specific fermentation products faster and better than at the normal production of raw sausage.

There are significant consequences resulting from producing raw sausage in accordance with the invention. The growth of negative microorganisms was found to be impeded by the "displacement effects" of the positive microorganisms. Furthermore, there was an improved stability of quality as it was possible to balance variations in the raw sausage meat. The consequence of this result is an improved standardization. The general highly significant increase in quality which is also expressed by the quicker and more uniform development of color, the more rapid attainment of cutting firmness and the more rapid maturing, makes possible an economic technology which is characterized by an enormously shortened processing time or storage time and by saving additional expenses. In the production in accordance with the invention, the shortened maturing time and the resultant reduced loss of water from the raw sausage are economically valuable. The products remain fresh in their effect and the additional loss of water during a long maturing time is avoided. A raw sausage which is healthful and more appealing to the senses is being offered to the consumer.

The caused rapid increase in the number of microorganisms which is the result of adding folic acid and/or folate, clearly demonstrates the same effects of the in starter cultures. Here, too, an increase is taking place in the population of present microorganisms. However, there is none of the typical "inversion effect" taking place after the maturing of the starter cultures. Thus, the characteristic storage properties of a natural raw sausage is maintained a without change in quality. In the second embodiment it will be shown that the addition of folic acid replaces starter cultures.

In the production of raw sausage such as, for instance, edible mold covered salami, the growth of the mold is desired. The third embodiment will show that mold growth is very well possible by folic acid enrichment. Compared to standardized products, the maturing time is noticeably lowered by more than 50%.

Moreover, given its properties, folic acid is an important building block for the therapeutic prevention and treatment of illnesses. In the body it is cytokinetically active and regenerates, for instance, epithelia of stomach, intestines and respiratory organs, and acts protectively in the cardiac circulatory system. Above all, it prevents arteriosclerotic changes. An oversupply and any problems of health resulting therefrom will not ensue from the planned large-scale utilization of folic acid and/or folate.

The novel features which are considered to be characteristic of the invention are set forth with particularity in the appended claims. The invention itself, however, in respect of its structure, construction and lay-out as well as its manufacturing techniques, together with other advantages and objects thereof, will be best understood from the following description of preferred embodiments.

DETAILED DESCRIPTION OF THE PREFERRED EMBODIMENTS

In the first embodiment standard cervelat sausage of the basic recipe was enriched by 4 mg, 8 mg and 10 mg of folic acid per kilogram of raw sausage meat.

| Cervelat Sausage - Basic Recipe | Charge 1 | Charge 2 | Charge 3 |
| --- | --- | --- | --- |
| Beef in % | 20 | 20 | 20 |
| Lean pork in % | 50 | 50 | 50 |
| Pork Fat in % | 30 | 30 | 30 |
| Nitrite Picking Salt in g/kg | 28.00 | 28.00 | 28.00 |
| Ground Black Pepper in g/kg | 2.50 | 2.50 | 2.50 |
| Shredded Black Pepper in g/kg | 1.00 | 1.00 | 1.00 |
| Glucose in g/kg | 6.00 | 6.00 | 6.00 |
| Ascorbic Acid in g/kg | .20 | .20 | .20 |
| Starter Culture in g/kg | .50 | .50 | .50 |
| Folic Acid in mg/kg | 4 | 8 | 10 |

Overall, the charges enriched by folic acid were superior to a reference cervelat sausage without folic acid.

After 24 hours, differences were seen in maturing were observed between the charges enriched by folic acid. The charge having a folic acid concentration of 10 mg per kg of raw sausage meat matured best and displayed most technological advances. The charges of 4 mg and 8 mg of folic acid per kg of raw sausage meat acted in accordance with the amount of folic acid used and were also highly distinctly different from the from the reference cervelat sausage without folic acid. The charges containing folic acid developed a positive sausage aroma, a high degree of cutting firmness and coloring typical of raw sausage. To check these observations during the maturing process standardized commonly practiced scientific sensor tests were repeatedly conducted 14, 21 and 28 days after production. Ten trained examiners constituted the test group; the products to be tested were utilized anonymously.

The result of the sensor tests highly significantly and unambiguously proves the superiority of the folic acid containing product of 10 mg folic acid per kg of raw sausage meat compared to other charges in respect of taste and odor characteristics.

Storage tests over eight weeks demonstrated the vastly superior stability of these positive characteristics relative to standardized cervelat sausage without added folic acid.

The application of 10 mg of folic acid per kg of raw sausage meat with has been found to be optimal is also sensible from a physiological point of view. For at an empirical loss of folic acid of about 30-40% during sausage manufacture, 6-7 mg of folic acid per kg of raw sausage meat remain in the product, and a consumption of 50-100 g of raw sausage falls well within the range of the recommended daily intake.

In the second embodiment, enrichment tests were conducted with folic acid with the same basic recipe of standard cervelat sausage, however, without using starter cultures.

| Cervelat Sausage - Basic Recipe | Charge 1 | Charge 2 | Charge 3 |
| --- | --- | --- | --- |
| Beef in % | 20 | 20 | 20 |
| Lean pork in % | 50 | 50 | 50 |
| Pork Fat in % | 30 | 30 | 30 |
| Nitrite Picking Salt in g/kg | 28.00 | 28.00 | 28.00 |
| Ground Black Pepper in g/kg | 2.50 | 2.50 | 2.50 |
| Shredded Black Pepper in g/kg | 1.00 | 1.00 | 1.00 |
| Glucose in g/kg | 6.00 | 6.00 | 6.00 |
| Ascorbic Acid in g/kg | .20 | .20 | .20 |
| Starter Culture in g/kg | — | — | — |
| Folic Acid in mg/kg | 4 | 8 | 10 |

The result of these tests indicates that the addition of 4-8 mg/kg of folic acid aids the use of starter cultures. The charge containing 10 mg per kg of raw sausage meat replaces the starter culture of about 0.50 g/kg of raw sausage meat. (0.5 g of starter culture per kg of raw sausage meat is a standard use of a commercially available starter culture.)

In the third embodiment, 8 mg of folic acid per kg of raw sausage meat were added during a process of producing edible mold salami. The production was carried out according to standardized recipes and basic production principles.

| Edible Mold Salami - Basic Recipe | 40 kg Charge |
| --- | --- |
| Beef in kg | 8 |
| Lean Pork in kg | 24 |
| Pork Fat in kg | 8 |
| Nitrite Pickling Salt in g | 840 |
| Ground Black Pepper in g | 90 |
| Shredded Black Pepper in g | 30 |
| Ascorbic Acid 80% in g | 15 |
| Starter Culture | — |
| Folic Acid in mg/kg | 8 |

For producing the edible mold salami, the beef and pork, cooled to −4° C., was chopped in a cutter to a fine granular state. During the next operational step, 8 mg of folic acid per kg of raw sausage meat were added, in addition to the mixture of spices. Following the succeeding addition and comminution of pork fat, mixing takes place with nitrite pickling salt so that the raw sausage meat would attain an appropriate bond. After the ensuing filling into natural sausage casings, the raw sausages were washed in tepid salt water and suspended on smoking rods.

Commercially acquired edible mold cultures were in accordance with instructions dissolved in drinking water and applied, uniformly distributed, to the sausages by spraying.

The edible mold salami were then stored at 93 relative humidity and about 23° C. for three days. After about two days, a layer of mold has attached itself and was visible after about 3 days. Thereafter, the relative humidity and the temperature were respectively lowered to about 88% and about 22° C. This setting was maintained in the maturing chamber for 2 days. Thereafter, the relative humidity was maintained at about 74% at a temperature of about 13° C. The edible mold salami finishes maturing under these conditions. In this stadium the layer of mold does not grow any more but it still contributes to developing typical aroma substances.

Using folic acid and/or folate, the edible mold salami requires about 21 days for its final maturing phase and then ready to be sold. By contrast, edible mold salami without folic acid produced by standard methods requires a maturing time of up to 90 days.

What is claimed is:

1. A method of accelerating the microbiological maturing process in making raw sausage, the method comprising the steps of:
   providing comminuted raw sausage meat;
   adding to the comminuted raw sausage meat in uniform distribution a quantity of about 4 mg to about 25 mg per kilogram of raw sausage meat at least one material selected from the group consisting of folic acid and folate; and
   allowing the raw sausage meat to mature microbiologically after addition of the material.

2. The method of claim 1, further comprising the step of adding spice to the comminuted raw sausage meat.

3. The method of claim 2, wherein the spice comprises at least one of ground black pepper and shredded black pepper.

4. The method of claim 2, wherein the material is added in a substantially uniform distribution during the step of adding spice.

5. The method of claim 4, wherein the raw sausage meat comprises beef, pork and pork fat.

6. The method of claim 2, further comprising the step of forming sausages by filling the raw sausage meat, spice and material into sausage casings.

7. The method of claim 6, further comprising the step of washing the sausages in water.

8. The method of claim 7, further comprising the step of treating the exterior of the sausages with edible mold dissolved in water.

9. The method of claim 8, further comprising the step of storing the sausages for a predetermined time at a predetermined relative humidity and temperature.

10. The method of claim 9, wherein the predetermined time is about 21 days.

11. The method of claim 10, wherein the sausages are stored for an initial three days at a relative humidity of about 93% and a temperature of 23° C.

12. The method of claim 11, wherein the sausages are stored for an additional two days at a relative humidity of about 88% and a temperature of 22° C.

13. The method of claim 12, wherein the sausages are thereafter stored at a relative humidity of about 74% and a temperature of about 13° C.

14. The method of claim 1, wherein the quantity of the material per kilogram of raw sausage meat is about 10 mg.

15. The method according to claim 1, wherein the acceleration amounts to a reduction of maturing time of more than 50%, compared to standardized raw sausage without added folic acid or folate.

16. The method according to claim 1, wherein the microbiological maturing step commences after stuffing the raw sausage meat into sausage casings.

17. The method according to claim 1, wherein no starter cultures are added in the process.

* * * * *